United States Patent Office 3,541,057
Patented Nov. 17, 1970

3,541,057
CONVERSION OF POLYAMIDE-ACIDS TO POLY-
IMIDES USING AN AROMATIC HETEROCYCLIC
CARBOXYLIC ANHYDRIDE CONTAINING A
TERTIARY NITROGEN AS CONVERTING AGENT
John Anthony Kreuz, Williamsville, N.Y., assignor to
E. I. du Pont de Nemours and Company, Wilmington,
Del., a corporation of Delaware
No Drawing. Continuation-in-part of application Ser. No.
534,426, Mar. 15, 1966. This application Jan. 21, 1969,
Ser. No. 792,861
Int. Cl. C08g 20/32
U.S. Cl. 260—78                              5 Claims

ABSTRACT OF THE DISCLOSURE

A process is provided for converting polyamide-acid to a polyimide by subjecting the polyamide-acid (preferably in the form of a shaped structure, e.g., a film structure) to the action of an anhydride converting agent, e.g., nicotinic acid anhydride.

The present application is a continuation-in-part of copending application Ser. No. 534,426 filed on Mar. 15, 1966 now abandoned.

THE INVENTION

This invention relates to chemical and heat conversion of polyamide-acids to the corresponding polyimides.

The chemical and heat conversion of polyamide-acids to the corresponding polyimides is known. Previously suggested chemical treating agents for this purpose have been lower fatty monobasic acid anhydrides such as acetic anhydride and aromatic monobasic acid anhydrides such as benzoic anhydride.

According to the present invention, advantages are obtained in these processes when the chemical converting agent is an anhydride of a particular class. The use of such an anhydride, more fully defined below, effects both the conversion function (dehydrating) and the catalysis of the conversion reaction.

According to the present invention, a polyamide-acid, in solution in a suitable inert organic solvent, is admixed with at least one anhydride of the class described below, at a temperature below about 50° C. to prevent any substantial conversion of the polyamide-acid to the polyimide; the resulting mass is formed into a shaped article; and the temperature of the article is thereafter raised to a temperature above about 75° C. to convert het polyamide-acid in the article to polyimide.

The polyamide-acids convertible to polyimides are well known and are disclosed for example in the following references:

Koerner et al., U.S. Pat. No. 3,022,200, Issued Feb. 20, 1962; Lavin et al., U.S. Pat. No. 3,105,775, Issued Oct. 1, 1963; Smith et al., U.S. Pat. No. 3,168,417, Issued Feb. 2, 1965; Edwards, U.S. Pat. No. 3,179,614, Issued Apr. 20, 1965;Endrey, U.S. Pat. No. 3,179,630, Issued Apr. 20, 1965; Endrey, U.S. Pat. No. 3,179,631, Issued Apr. 20, 1965; Hendrix, U.S. Pat. No. 3,179,632, Issued Apr. 20, 1965; Endrey, U.S. Pat. No. 3,179,633, Issued Apr. 20, 1965; Edwards, U.S. Pat. No. 3,179,634, Issued Apr. 20, 1965; Frost et al., U.S. Pat. No. 3,179,635, Issued Apr. 20, 1965.

Also French Pat. No. 1,386,617. Also copending U.S. patent applications Ser. No. 468,140 filed June 29, 1965, by Lindsey & Locey; Ser. No. 472,314 filed July 15, 1965, by Sorenson; Ser. No. 532,898, filed Mar. 9, 1966, by Tocker; and Ser. No. 532,886, filed Mar. 9, 1966, by Rogers; each of these applications being assigned to the same assignee as that of the present invention. The entire disclosures of all of the above references are hereby incorporated by reference.

As can be seen from the references, useful polyamide-acids include those of the AB type formed by self-condensation of an amino aromatic dicarboxylic acid anhydride or acid salt thereof, as well as those of the AA-BB type formed by reaction of an aromatic tricarboxylic acid anhydride or acid halide thereof, or a tetracarboxylic acid dianhydride, with an organic diprimary diamine. Either or both of the tetracarboxylic acid dianhydride and the organic diamine can be aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof.

The anhydride converting agents useful in the processes of this invention contain tertiary amino groups and non-cyclic anhydride groups derived from monocarboxylic acids. The term "non-cyclic" as used herein refers only to the anhydride portion of the molecule, and not to the remainder of the molecule to which the anhydride is attached. More specifically, the useful agents include the following:

(A) Anhydrides of aromatic heterocyclic carboxylic acids containing at least one tertiary nitrogen in the heterocyclic ring where the carboxy groups are attached to carbons in the ring, such as the following:

nicotinic acid anhydride
isonicotinic acid anhydride
picolinic acid anhydride (B) Anhydrides of the formula:

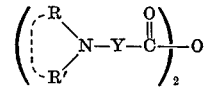

where R is alkyl of 1 through 4 carbons; R' is alkyl of 1 through 4 carbons or benzyl; R and R' can be taken together and in such case can be alkylene of 2 through 6 carbons or —CH$_2$—CH$_2$—O—CH$_2$—CH$_2$—; and Y is a branched or straight chain alkylene radical of 1 through 6 carbons. Representative are the following:

N,N-dimethylalanine anhydried
N,N-dimethyl-alpha-aminobutyric acid anhydride
N,N-dimethyl-alpha-aminoisovaleric acid anhydride
N,N-dimethyl-alpha-amino-n-valeric acid anhydride
N,N-dimethyl-alpha-aminoisocaproic acid anhydride
N,N-dimethyl-beta-aminobutyric acid anhydride
N,N-dimethyl-gamma-amino-n-valeric acid anhydride
N,N-dimethyl-delta-amino-n-valeric acid anhydride
N,N-dimethyl-epsilon-amino-n-caproic acid anhydride
N,N-dimethyl-zeta-amino-n-heptoic acid anhydride
  epsilon-piperidinocaproic acid anhydride
N,N-diisopropyl-alpha-aminobutyric acid anhydride
N-benzyl-N-ethyl-alpha-aminoisovaleric acid anhydride (C) Anhydrides of the formula:

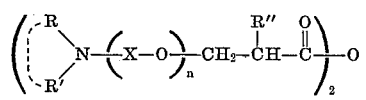

where R and R' are the same as above; R" is selected from the group consisting of hydrogen, chlorine, methyl and phenyl; X is ethylene which can have a phenyl substituent or 1 or 2 alkyl substituents of 1 through 4 carbons each, phenylene or benzylene; and $n$ is zero or 1. Representative are the following:

beta-(N-benzyl-N-methylamino) propionic acid anhydride
beta-(N,N-diethylamino) propionic acid anhydride
beta-(N,N-dimethylamino)-alpha-chloropropionic acid anhydride
beta-(N,N-dimethylamino)-isobutyric acid anhydride
beta-(N,N-dimethylamino)-alpha-phenylpropionic acid anhydride
beta-morpholino propionic acid anhydride
beta-(N,N-dimethylaminoethoxy) propionic acid anhydride
beta-(N,N-dimethylamino-2,2-dimethylethoxy) propionic acid anhydride
beta-(N,N-dimethylamino-2-ethylethoxy) propionic acid anhydride
beta-(N,N-dimethylamino-3-benzyloxy) propionic acid anhydride
beta-piperidino propionic acid anhydride (D) Anhydrides of benzoic and naphthoic acids substituted with a dialkylamino group where each alkyl radical has 1 through 4 carbons. Representative are the following:

o-(N,N-dimethylamino) benzoic acid anhydride
m-(N,N-dimethylamino) benzoic acid anhydride
p-(N,N-dimethylamino) benzoic acid anhydride
8 - (N,N-dimethylamino) - 1 - naphthoic acid anhydride
p-(N,N-diethylamino) benzoic anhydride The above anhydrides can be readily prepared by techniques known to skilled chemists. For example, anhydrides of class (A) above are prepared in conventional methods from the corresponding acids. Procedures useful in the preparation of anhydrides of class (B) above include reaction of a secondary amine with an appropriately substituted aliphatic monocarboxylic acid, followed by dehydration to the anhydride. Related to class (C) is the addition of dialkyl amines or N,N-dialkyl alkanolamines to acrylic acids, followed by dehydration. Related to class (D) is the reduction of nitro aromatic carboxylic acids, followed in turn by alkylation of the amino group and dehydration to the anhydride.

The conditions of the conversion process in such details as temperatures, solvents, concentrations, shaping of articles, etc., are all routine.

In the process of the present invention, the polyamide-acid in solution and the anhydride converting agent are mixed under conditions that prevent any substantial conversion of the polyamide-acid to polyimide. Although the stoichiometric equivalent, based on the polyamide-acid, of the converting agent is operable in the present invention, it is preferred to use 1.5–3.0 times the stoichiometric amount of the converting agent. The converting agent readily dissolves in the polyamide-acid solution and the resulting solution can be held for several hours at temperatures as high as about 50° C., or 24 hours at 25° C., without gelation.

During this step in which the converting agent and the polyamide-acid solution are admixed, the temperature will be maintained below that which could cause conversion of the polyamide-acid to polyimide. The particular temperature maintained during this step will generally be below about 50° C. and will depend upon the solvent used, the reactivity of the particular converting agent used and the concentration of the materials in the solution. Ordinarily, the polyamide-acid solution containing the converting agent is maintained at a temperature of about −5° C. to 15° C. and in some cases up to room temperature. At such temperatures the system remains essentially inactive, meaning that no more than about 10% by weight of the polyamide-acid is converted to polyimide in about 10 minutes at this temperature. It should be understood that more conversion can be tolerated. The particular amount will depend upon the particular polymer being used, the nature and amount of solvent and the method contemplated for shaping the polymeric composition into a useful article.

Shaping can be performed in a wide variety of procedures. The polyamide-acid solution can be extruded, spun, sprayed, blade-coated or molded. Films of the solution can be conveniently formed by extruding the solution through an orifice onto a belt, drum or similar smooth surface. Fibers can be made by "dry" spinning. Foams can be made by techniques disclosed in Hendrix U.S. patent application Ser. No. 266,065 and Amborski & Weisenberger U.S. patent application Ser. No. 266,066, both filed Mar. 18, 1963 and now U.S. Pat. Nos. 3,249,561 and 3,310,506, respectively. The polyamide-acid solution may also be sprayed onto a surface to provide a coating. Spraying is particularly useful for coating irregularly shaped articles and rough surfaces and for impregnating porous materials. Fillers or other additives (pigments, abrasives, etc.) can be added at any time prior to shaping.

After the polyamide-acid/converting agent solution has been converted into a film, fiber, powder or the like, or has been used to coat or impregnate a substrate, the article can be stored in the unconverted condition, or heated to at least 75–100° C. to effect cyclization to the imide.

The invention will be more clearly understood by referring to the examples which follow, in which parts and percentages are by weight unless otherwise indicated. These examples, which illustrate specific embodiments of the present invention, should not be construed to limit the invention in any way.

EXAMPLE 1

A solution of 1.35 gram of nicotinic anhydride in about 10 milliliters of N,N-dimethylacetamide was mixed with 10 grams of a 15% by weight solution in N,N-dimethylacetamide of the polypyromellitamide-acid of cumene diamine. The polymer solution became orange in a few minutes and was allowed to remain in a dry box overnight. A thin film was cast with a 1.5 mil Bird Applicator and the solvent was evaporated under nitrogen and vacuum. Infrared examination of this film showed it to be composed of a combination of the corresponding poly-n-imide and poly(iminolactone).

EXAMPLE 2

Two 10 gram portions of a 10.9% solid solution of the polypyromellitamide-acid of bis(4-aminophenyl) ether were placed in containers in a constant temperature bath at 33° C. and each was mixed with a different chemical converting reagent. One sample was admixed with 0.68 milliliter of acetic anhydride, 0.67 milliliter of beta-picoline and 3.7 milliliters of N,N-dimethylacetamide. To the other sample was added 1.19 gram of nicotinic anhydride and 5 milliliters of N,N-dimethylacetamide. The sample containing the acetic anhydride/beta-picoline gelled in 10 minutes, whereas the sample containing nicotinic anhydride was flowable after 2.5 hours. Both cyclized the polymer to polyimide.

EXAMPLE 3

A 4.90 gram quantity of nicotinic anhydride was dissolved in a minimum amount of N,N-dimethylacetamide and then mixed with 30 grams of a 15% by weight solution in N,N-dimethylacetamide of the polypyromellitamide-acid of bis(4-aminophenyl) ether. After two hours at 32° C., gelling did not occur, but on standing over the weekend a gel of the corresponding imide formed.

EXAMPLE 4

To 30 grams of a 15% by weight solution in N,N-dimethylacetamide of the polypyromellitamide-acid of bis(4-aminophenyl) ether was added 4.90 grams of nicotinic anhydride dissolved in a minimum amount of N,N- dimethylacetamide. The resulting viscous solution was poured onto a thin release sheet of tetrafluoroethylene polymer supported by a metal sheet, and having a 10-mil spacer of tetrafluoroethylene around the edge (spacers of other thicknesses can also be used, depending on the film thickness desired); on top of this is placed another release sheet of tetrafluoroethylene, and finally another metal sheet. The whole assembly was pressed at 100° C. at 30 tons pressure (high pressure used only to insure good contact for heat transfer) for 9 minutes to convert the viscous polyamide-acid solution to a gel polyimide film. This film was extracted with benzene and dried to give a film of the polypyromellitimide of bis-(4-aminophenyl) ether.

EXAMPLE 5

(a) A 20% solids by weight solution was prepared of the polypyromellitamide-acid of pyromellitic dianhydride and bis(4-aminophenyl) ether in N,N-dimethylacetamide. A 10 gram sample of this solution was designated "Solution A." Another solution (Solution B) was prepared of 1.4 mls. of acetic anhydride, 1.4 mls. of beta-picoline in 15 mls. of N,N-dimethylacetamide. Solution A when mixed with Solution B at room temperature (about 25° C.) formed a gel in about 15 minutes.

(b) The foregoing preparation of Solutions A and B was repeated, and the mixed solution was poured into a press in the manner described in Example 4 and subjected to 20 tons pressure at 100° C. The mixed solution gelled in about 30 seconds.

(c) The preparation of Solution A as in paragraph (a) above was repeated. In this instance, Solution B was prepared by dissolving 3.58 grams of nicotinic anhydride in 15 mls. of N,N-dimethylacetamide at 50° C. Solution B in its warmed state was then mixed with Solution A and the mixed solution was allowed to cool to room temperature, and no gelling of the mixed solution was observed after 30 minutes following the mixing of these solutions.

(d) The preparation of Solutions A and B described in paragraph (c) was repeated and a portion of the mixed solution was poured into a press in the manner described in paragraph (b) above and subjected to 20 tons pressure at 100° C. A gel film was obtained in about 2 minutes.

(e) The preparation of Solution A as in paragraph (a) above was repeated. In this instance, Solution B was prepared by mixing 1.4 mls. of acetic anhydride in 15 mls. of N,N-dimethylacetamide. Solution A was then mixed with Solution B, and no gel formation was observed after 30 minutes, nor after 16 hours following mixing.

(f) The preparation of Solutions A and B described in paragraph (e) was repeated and a portion of the mixed solution was poured into a press in the manner described in paragraph (b) above and subjected to 20 tons pressure at 100° C. The mixed solution still had not gelled after 30 minutes.

Additional exemplary illustrations of the practice of the present invention can be demonstrated by substituting an equivalent amount of each of the compounds listed hereinbefore in the description of the useful compounds of this invention for the converting agents of the foregoing examples, with similarly satisfactory results.

It is to be understood that the foregoing detailed description is given merely by way of illustration and that many variations may be made therein without departing from the spirit or scope of this invention.

What is claimed is:
1. A process for converting polyamide acids to polyimide polymeric material wherein said polyamide acid is selected from group consisting of AA–BB polymers formed by reaction of (a) at least one compound selected from the group consisting of aromatic tetracarboxylic dianhydrides with (b) an organic diprimary diamine, which comprises mixing said polyamide-acid in a suitable inert organic solvent with an anhydride converting agent at a temperature below about 50° C.; shaping the resulting mixture into a shaped polyamide-acid polymeric article; and thereafter heating said shaped article at a temperature above about 75° C. thereby to convert said polyamide-acid in said shaped article to polyimide, wherein said anhydride converting agent is selected from the group consisting of:

anhydrides of aromatic heterocyclic carboxylic acids containing at least one tertiary nitrogen in the heterocyclic ring where the carboxy groups are attached to carbons in the ring.

2. The process of claim 1 wherein said shaped article is a self-supporting film.

3. The process of claim 1 wherein said anhydride is nicotinic acid anhydride.

4. The process of claim 1 wherein said anhydride is isonicotinic acid anhydride.

5. The process of claim 1 wherein said anhydride is picolinic acid anhydride.

References Cited
UNITED STATES PATENTS

| | | | |
|---|---|---|---|
| 3,179,630 | 4/1965 | Endrey | 260—78 |
| 3,179,632 | 4/1965 | Hendrix | 260—78 |

WILLIAM SHORT, Primary Examiner

H. SCHAIN, Assistant Examiner

U.S. Cl. X.R.

117—161; 156—331; 161—214, 227; 260—2.5, 32.6, 47; 264—51, 216